United States Patent [19]

Norman

[11] 4,054,745
[45] Oct. 18, 1977

[54] MOTOR CONTROL DEVICE FOR DATA TERMINALS

[75] Inventor: Stanley R. C. Norman, Brockville, Canada

[73] Assignee: GTE Automatic Electric (Canada) Limited, Brockville, Canada

[21] Appl. No.: 748,079

[22] Filed: Dec. 6, 1976

[51] Int. Cl.² .......................... H04L 7/00; H04N 1/32
[52] U.S. Cl. .................................. 178/4.1 R; 358/267
[58] Field of Search .................. 178/4.1 R, 69.1, 2 R, 178/3, 4.1 A, 4.1 B; 358/268, 267, 277; 340/172.5

[56] References Cited

U.S. PATENT DOCUMENTS

| 2,640,874 | 6/1953 | McConnell et al. | 358/267 |
| 2,759,043 | 8/1956 | Long | 178/4.1 R |
| 2,944,104 | 7/1960 | Neagle, Jr. | 178/4.1 R |
| 3,264,406 | 8/1966 | Cohen et al. | 178/4.1 R |
| 3,582,798 | 6/1971 | Veale | 358/267 |

Primary Examiner—Thomas A. Robinson
Attorney, Agent, or Firm—Robert J. Black

[57] ABSTRACT

A control device is described for linking a motor operated data terminal to a data processor which provides information signals including data characters and data terminal motor-start signals. The motor associated with the data terminal is selectively operable between an on condition and an off condition and is programmed to switch from the on condition to the off condition after a first predetermined interval following the last reception of data characters from the data processor. The data terminal motor switches to the on condition upon receipt of a data terminal motor-start signal and reaches its normal operating speed in at least a second predetermined interval after the receipt of a data terminal motor-start signal. The control device includes means for receiving the information signals from the data processor and for transmitting such signals to the data terminal. A first circuit of the control device is responsive to received information signals from the data processor for providing a motor-on status signal to the data processor and is responsive to the absence of information signals for the first predetermined interval for providing to the data processor a motor-off signal. A second circuit of the control device senses the receipt of a motor-start signal from the data processor for providing the data processor with a data terminal busy condition signal of a second predetermined interval. Following the expiration of the second predetermined interval, a terminal non-busy signal is provided to indicate to the data processor that data characters may be sent. Accordingly, upon interruption of transmission of data characters by the data processor for an interval of time equal to the first predetermined interval, the data processor is provided by the control device with a motor-off signal to indicate that a motor-start signal must be sent prior to further transmission of data characters. Upon transmission of a motor-start signal, the data processor is provided with a motor-on signal and a terminal busy condition signal. The terminal busy condition signal further inhibits transmission of data characters for the second predetermined interval until a terminal non-busy condition signal is provided.

7 Claims, 2 Drawing Figures

MOTOR CONTROL DEVICE FOR DATA TERMINALS

BACKGROUND OF THE INVENTION

This invention relates generally to motor control devices and particularly to such devices for use with motor controlled data terminals.

Data terminals such as teletypewriters, line printers and the like are usually powered by an internal motor and adapted to print out data characters received from a local or remote data processor. Prior to the receipt of data characters by the data terminal, its internal motor must be running at its normal operating speed to ensure that the characters are printed correctly. If the data terminal attempts to print the received characters before its internal motor reaches its normal operating speed, the result may be an incorrect printout.

To avoid the problem of incorrectly printing a data character before the motor reaches its normal operating speed, some data terminals use heavy duty motors which run constantly. More often, a lighter duty motor is used with a timer which turns the motor off when the data terminal has not received a data character for printing within a predetermined interval, such as one and one half minutes, for example. Such terminals restart the motor upon receipt of a data character but are not capable of accurately printing out a received character until after the motor has reached its normal operating speed.

OBJECTS OF THE INVENTION

Accordingly, it is an object of this invention to provide an improved motor control device for use with data terminals whose internal motors do not run constantly.

It is a more specific object of this invention to provide a motor control device for starting the motor associated with a data terminal and for inhibiting its receipt of data characters until its motor has reached its normal operating speed.

BRIEF DESCRIPTION OF THE DRAWINGS

These and other objects of the invention are more particularly set forth in the following detailed description and in the accompanying drawings of which.

DESCRIPTION OF THE PREFERRED EMBODIMENT

Broadly stated, the control device according to this invention provides an interface between a motor operated data terminal whose motor is programmed to stop after a preselected idle time following the last receipt of a data character and a data processor which transmits data characters to the data terminal for printing. The control device permits data characters to be coupled from the data processor to the data terminal only when the motor associated with the data terminal is running at its normal operating speed to thereby insure that the first data character received by the data terminal is accurately printed.

The control device described herein provides means for receiving a motor-start signal and subsequent data characters from the data processor and for sending such signals to the data terminal. When the motor-start signal is sent, the data terminal motor is started and the control device generates a motor-on signal and a terminal busy condition signal of a predetermined duration to inhibit the data processor from sending data characters for that predetermined duration, thereby permitting the motor associated with the data terminal to reach its normal operating speed before the data processor sends data characters to be printed.

Upon expiration of that predetermined interval, the control device generates a terminal non-busy signal to indicate to the data processor that data characters may be sent. Upon interruption of transmission of data characters by the data processor for another predetermined interval of time, the control device generates a motor-off signal to indicate to the data processor that a motor-start signal must be sent prior to further transmission of the data characters because the motor associated with the data terminal will not be running.

The way in which the motor control device interfaces with and controls a data processor and a motor operated data terminal will now be described with reference to FIG. 1.

Figure 1:
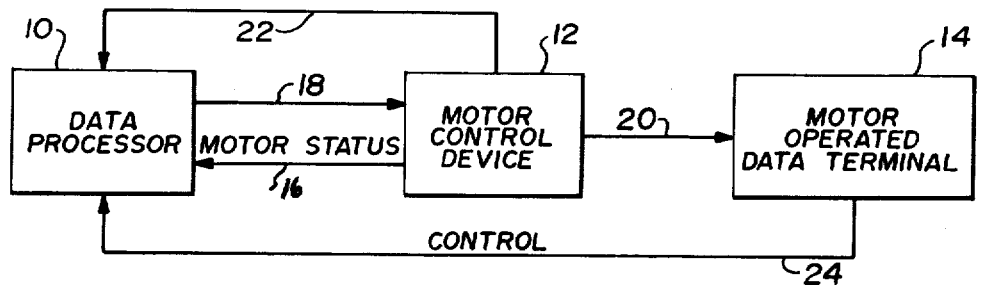
FIG. 1 is a block diagram illustrating generally the operation of a motor control device according to this invention.

Shown in FIG. 1 are a data processor 10, a motor control device 13, and a motor operated data terminal 14. The data processor 10 may be a computer for sending data characters to the data terminal 14 for printing. The data terminal 14 may be a teletypewriter or printer which is controlled by an internal motor (not shown) which must be running at its normal operating speed in order for the data terminal to accurately print the data characters received from the data processor 10. The motor associated with the data terminal 14 typically includes some form of timer for turning off the motor after a preselected idle time following the last receipt of data characters from the data processor 10. Thus, excessive wear on the motor is avoided when the data terminal 14 is idle.

The motor control device 12 interfaces with the data processor 10 and the data terminal 14 to start the motor associated with the data terminal 14 before the data processor 10 sends data characters for printing and to inhibit the data processor 10 from sending further data characters when the preselected idle time of the motor associated with the data terminal 14 has expired. Thus, the data terminal 14 will receive data characters for printing only when its associated motor is on and running at its normal operating speed.

In order to inhibit the data processor 10 from sending data characters when the motor associated with the data terminal 14 is off, the motor control device 12 provides a motor status line 16 coupled to the data processor 10 to indicate to the data processor 10 whether the motor associated with the data terminal 14 is off or on. If the motor status line 16 indicates that the motor is on, the data processor 10 sends data characters to the motor control device 12 via a line 18. The data characters received by the motor control device 12 are coupled via a line 20 to the data terminal 14 which prints the received data characters.

If the motor status line 16 indicates that the motor associated with the data terminal 14 is off, the data processor sends a motor-start signal to the motor control device 12 via the line 18. The motor-start signal is coupled to the data terminal 14 via line 20 to start its motor. The motor-start signal may include one or more signals for initiating the motor start sequence but is referred to herein as a single instruction for convenience.

In order to permit the motor associated with the data terminal to reach its normal operating speed before the data processor 10 begins sending data characters, the motor control device 12 generates a terminal busy condition signal on line 22 to temporarily inhibit the data processor from sending data characters. The terminal busy condition signal lasts for a predetermined duration, one second for example, during which the motor associated with the data terminal 14 is coming up to its normal operating speed. Upon the expiration of the terminal busy condition signal, the control device generates a terminal non-busy condition signal on line 22 to indicate to the data processor that data characters may be sent.

When the terminal non-busy condition signal is generated, the data processor 10 begins sending data characters via line 18 to the motor control device 12 and thence to the data terminal 14 via line 20. The data terminal 14 prints the received data characters correctly because its associated motor is now running at its normal operating speed.

As pointed out above, the motor associated with the data terminal 14 may be timed to turn off when no data characters have been received for printing for a preselected interval. In order to ensure that the data processor 10 does not send additional data characters after a long interval during which no data characters were sent, the motor control device 12 generates a motor-off signal on line 16. The motor-off signal is generated after a predetermined interval following the generation of the motor-on signal and prior to the termination of the preselected idle time of the motor associated with the data terminal 14 to inhibit the data processor 10 from sending data characters after the motor associated with the data terminal 14 has been turned off. For the data processor 10 to send additional data characters, it must go through the motor start up procedure of sending a motor start signal via line 18 and sensing the occurrence of a motor-on signal on line 16 and a terminal non-busy condition signal on line 22.

The mode of operation described above wherein the data characters which were sent to the data terminal 14 originated from the data processor 10 is referred to as "simplex" operation. This is to distinguish it from "duplex" operation wherein data characters originate from a manually operable keyboard on the data terminal 14.

In the duplex mode of operation, an operator may actuate a control key (commonly referred to as a "break" key when the data terminal 14 is a teletypewriter) to send a control signal via a control line 24 to the data processor 10. The receipt of the control signal by the data processor 10 indicates that data characters are to be sent via line 24 to the data processor 10 and that such data characters are to be transmitted back to the data terminal 14 via the motor control device 12 for printing by the data terminal 14. The data processor 10 responds to the control signal on line 24 by sensing the motor status line 16 and by transmitting th data characters back to the data terminal 14 if the signal on the motor status line 16 indicates that the data terminal motor is running. If the data terminal motor is not running, the data processor 10 will initiate the above described motor start sequence. When the signal on the motor status line 16 indicates that the data terminal motor is running and when the non-busy condition signal on line 22 appears, the data processor 12 will send the data characters to the motor control device 12 via line 18 and thence to the data terminal 14 via line 20.

Figure 2:
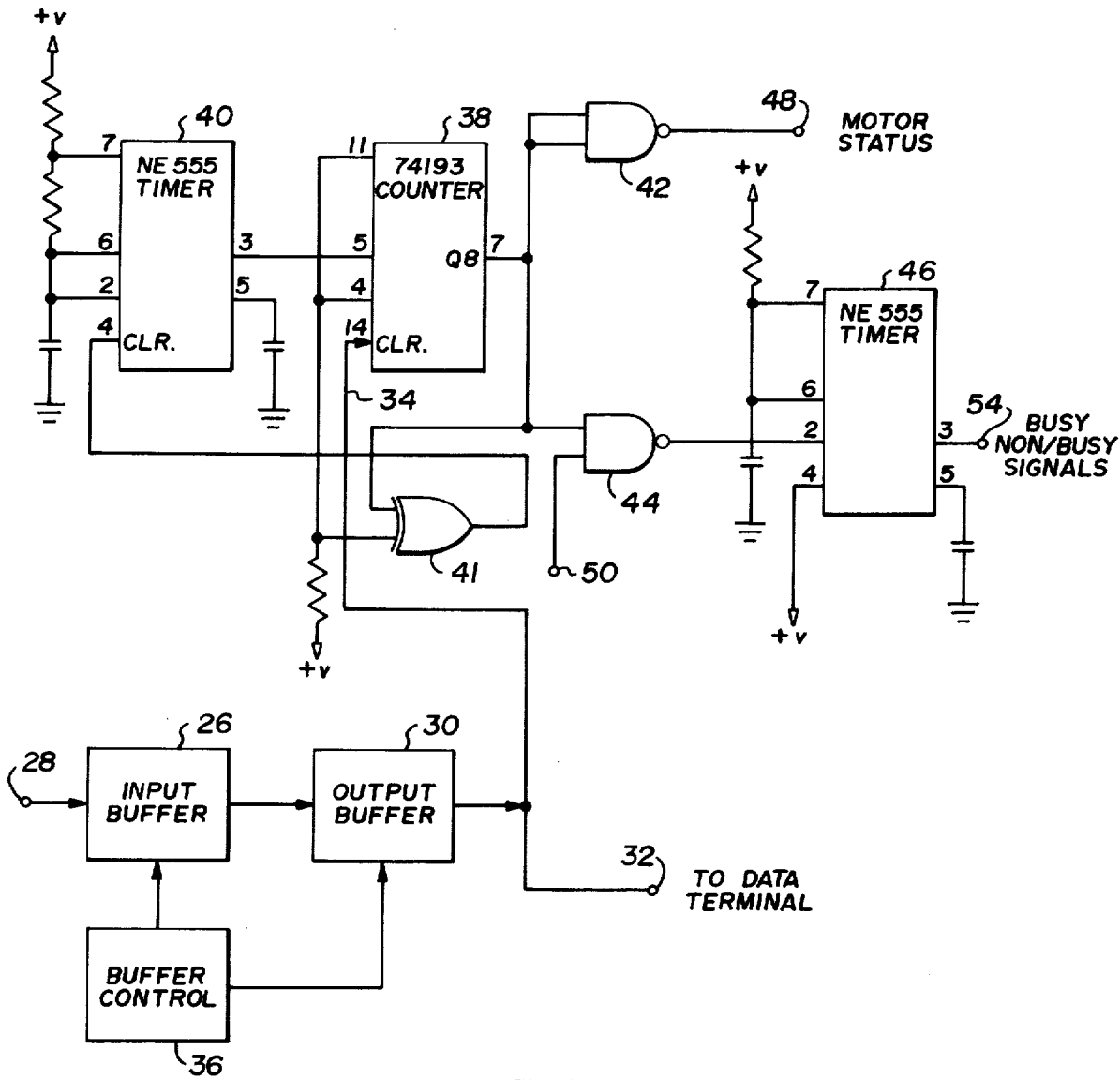
FIG. 2 is a schematic diagram illustrating exemplary circuitry for effecting the functions of the motor control device of FIG. 1.

Referring now to FIG. 2, exemplary circuitry is shown for effecting the above described functions of the motor control device 12. The motor control device 12 includes an input buffer 26 for receiving the motor-start signal and data characters from the data processor 10 (FIG. 1) via an input terminal 28. The input buffer 26 may comprise of set of flip flops for storing in parallel form the information received from the input terminal 28.

An output buffer 30 receives the information stored in the input buffer 26 and converts it from its parallel form to a serial form for transmittal to the data terminal 14 (FIG. 1) via terminal 32 and to other circuitry of the motor control device 12 via a line 34.

The information stored in the input buffer 26 is coupled to the output buffer 30 by the operation of a buffer control circuit 36 when the buffer control 36 senses the absence of stored information in the output buffer 30 and the presence of stored information in the input buffer 26.

Circuitry for generating the motor status signal to indicate to the data processor 10 whether the data terminal motor is on or off includes a counter 38, a timer 40, an exclusive OR gate 41, used herein as an inverter, and a NAND gate 42.

Circuitry for generating the terminal busy condition signals and non-busy condition signal includes a NAND gate 44 and a timer 46.

If a long interval of time has elapsed since the data processor 10 has sent data characters, a motor status terminal 48 will be at a logic level 0 to indicate to the data processor 10 that the data terminal motor is not running. Upon sensing a logic level 0 at the terminal 48, the data processr 10 initiates the motor start-up sequence by sending a null character (all zeros) to the input terminal 28. Simultaneously, a control terminal 50 receives a momentary logic level 1 either from the data processor 10 or from conventional circuitry which may sense the receipt of the null character at terminal 28 and provide the momentary logic level 1 at terminal 50. The NAND gate 44 receives the logic level 1 from terminal 50 and another logic level 1 from pin 7 of the counter 38, thereby providing high-level signals to both inputs of the NAND gate 44.

In response to the high level signals at its inputs, the NAND gate 44 generates a low level or logic 0 signal at its input lead 52 which is coupled to pin 2 of the timer 46. In response to the logic level 0 at its pin 2, the timer 46 generates a terminal busy condition signal at terminal 54, and maintains the busy condition signal for a predetermined interval, such as one second. The timer 46 automatically terminates the busy condition signal at terminal 54 after the predetermined interval and generates the terminal non-busy condition signal.

While the busy condition signal at terminal 54 was being generated, the buffer control 36 shifted the null character (motor-start signal) from the input buffer 26 to the output buffer 30, from which it is coupled to the terminal 32 and thence to the data terminal 14 to start the data terminal motor. The null character is also coupled via line 34 to pin 14 of the counter 38 to reset the counter. Upon becoming reset, the counter 38 generates a logic level 0 at its pin 7 which thereby disables the NAND gate 44 so that the timer 46 may not thereafter be actuated until a new start-up sequence has begun. The logic level 0 now present at pin 7 of the counter 38 constitutes a "motor-on" signal which is coupled via the NAND gate 42 to the motor status terminal 48 to indicate to the data processor 10 that the data terminal motor is now running. The data processor 10 now senses the presence of the motor-on signal at terminal 48 and the busy condition signal at terminal 54. The motor-on signal at terminal 48 will continue to be present but the busy condition signal at terminal 54 will terminate after a predetermined time which is long enough to allow the motor associated with the data terminal 14 to reach its operating speed. Thereafter, a non-busy condition signal is present at terminal 54 to indicate to the data processor 10 that it may begin sending data characters to the terminal 28 of the motor control device 12.

In order to generate a motor-off signal at terminal 48 if no data characters are then received from data processor 10, the counter 38 counts periodic pulses which are generated by the timer 40, which pulses may occur every 8 seconds, and when the counter 38 counts a predetermined number of these pulses, 8 for example, it will generate a motor-off signal in the form of a logic level 1 at its pin 7. The NAND gate 42 will convert this logic level 1 to a logic level 0 at terminal 48 to inhibit the data processor 10 from sending data characters. The logic level 1 now present at the output pin 7 of the counter 38 does not cause the NAND gate 44 to reactivate the timer 46 because terminal 50 is now at a low level.

In the case where the data processor 10 sends data characters to terminal 28 before the counter 38 has had an opportunity to count the predetermined number of pulses from timer 40, the received data characters will reset the counter 38 so that it begins counting anew the periodic pulses generated by the timer 40. Thus, each data character received by the counter 38 prior to its counting a predetermined number of pulses generated by the timer 40 will reset the counter 38 and prevent it from generating a motor-off signal (logic level 1) at its pin 7.

As pointed out above, the data terminal motor may include a timer to shut the data terminal motor off after a predetermined idle time following the last receipt of data characters by the data terminal. However, the motor control device 12 inhibits the data processor from sending characters when the data terminal motor is off by generating a motor-off signal when no data characters are received from the data processor 10 in an interval which is shorter than the predetermined idle time of the data terminal motor. For example, if the idle time of the data terminal motor is 1½ minutes, the timer 40 may be programmed to generate a pulse every 8 seconds and the counter 38 may be programmed to count 8 of the timer's pulses before generating a motor-off signal. Thus, a motor-off signal may be generated when no data characters have been received prior to the elapse of 64 seconds. Any data character which is received prior to the elapse of 64 seconds will reset the counter 38 to initiate a new 64 second interval during which additional data characters may be received and transmitted to the data terminal.

Because the motor control device described herein generates motor-on and motor-off signals independently of the operation of the data terminal motor, care must be taken to ensure that such signals accurately characterize the condition of the data terminal motor. With that in mind, the motor control device 12 generates a busy condition signal of one second after the motor is first started to allow the motor to reach its operating speed. Further, the motor-off signal is generated prior to the expected turn off of the motor to ensure that the data terminal receives no data characters while its motor is off. For example, the embodiment shown in FIG. 2 generates a motor-off signal 64 seconds after the last character was sent by the data processor 10. If the normal idle time of the data terminal motor is 1½ minutes, a reasonable margin for error (26 seconds) is provided in case the idle time of the data terminal motor is shorter than expected.

The motor control device described herein provides an interface between the data processor and a motor operated data terminal to ensure that data characters are received by the data terminal only when its associated motor reaches its normal operating speed. Although such a motor control device has been described in terms of a particular embodiment, it will be apparent to those skilled in the art that many modifications and alterations may be made therein without departing from the broader aspects of the invention. Accordingly, it is intended to embrace all such modifications and alterations which fall within the spirit and scope of the invention is defined by the appended claims.

What is claimed is:

1. A control device linking a data processor to a motor operated data terminal wherein the data processor provides information signals including data characters and data terminal motor-start signals, and wherein the data terminal motor is selectively operable between an on condition and an off condition, is programmed to switch from the on condition to the off condition after a first predetermined interval following the last reception of data characters from the data processor, switches to the on condition upon receipt of a data terminal motor-start signal, and reaches its normal operating speed in at least a second predetermined interval after the receipt of a data terminal motor-start signal, said control device comprising:

means for receiving information signals from the data processor and for transmitting the information signals to the data terminal;

a first circuit for sensing receipt of information signals from the data processor and for providing a motor status signal to the data processor, said first conduit being responsive to receipt of information signals from the data processor for providing a motor-on status signal, and responsive to the absence of information signals from the data processor for a first predetermined interval for providing a motor-off status signal;

a second circuit for sensing the receipt of a motor-start signal from the data processor for providing to the data processor a terminal busy condition signal of a second predetermined interval, and for thereafter providing to the data processor a terminal non-busy condition signal upon the expiration of said second predetermined interval, whereby upon interruption of transmission of data characters by said data processor for an interval of time equal to said first predetermined interval, said control device provides a motor-off signal to the data processor to indicate that a motor-start signal must be sent prior to further transmission of data characters, whereby upon transmission thereafter of a data terminal motor-start signal by the data processor to the control device, said first circuit provides a motor-on status signal to the data processor and said second circuit provides a terminal busy condition signal to the data processor, the terminal busy condition signal further inhibiting transmission of data characters for said second predetermined interval until said second circuit thereafter provides a terminal non-busy condition signal.

2. A control device as set forth in claim 1 wherein said first circuit includes a first timer for generating periodic pulses and a counter responsive to the receipt of a motor-start instruction for counting said periodic pulses to generate the motor-off status signal when said counter counts a predetermined number of periodic pulses.

3. A control device as set forth in claim 2 wherein said counter becomes reset upon the receipt by said control device of a data character from the data processor so that no motor-off status signal is generated whenever a data character is received prior to said counter counting said predetermined number of periodic pulses.

4. A control device as set forth in claim 2 wherein said means for receiving and transmitting information signals includes an input buffer for receiving the information signals, an output buffer for sending the information signals to the data terminal, and control means for coupling the information signals from said input buffer to said output buffer.

5. A control device as set forth in claim 2 wherein said second circuit means includes a second timer for generating the busy condition signal, said second timer being programmed to generate the busy condition signal when a motor start instruction is received and to automatically terminate the busy condition signal after a time interval corresponding to the second predetermined interval.

6. A control device linking a data processor to a motor operated data terminal wherein the data processor provides information signals including data characters and data terminal motor-start signals, and wherein the data terminal motor is selectively operable between an on condition and an off condition, is programmed to switch from the on condition to the off condition after a first predetermined interval following the last reception of data characters from the data processor, switches to the on condition upon receipt of a data terminal motor-start signal, and reaches its normal operating speed in at least a second predetermined interval after the receipt of a data terminal motor-start signal, said control device comprising:

means for receiving information signals from the data processor and for transmitting the information signals to the data terminal;

a first circuit for sensing receipt of information signals from the data processor and for providing a motor status signal to the data processor, said first circuit being responsive to receipt of information signals from the data processor for providing a motor-on status signal, and responsive to the absence of information signals from the data processor for a first predetermined interval for providing a motor-off status signal; and a second circuit for sensing the motor status signal of said first circuit and for providing to the data processor a data terminal condition signal, said second circuit normally providing a non-busy terminal condition signal but responsive to a change in the motor status signal from a motor-off signal to a motor-on signal for providing a busy terminal condition signal for a second predetermined interval, whereby upon interruption of transmission of data characters by said data processor for an interval of time equal to said first predetermined interval, said control device provides a motor-off signal to the data processor to indicate that a motor-start signal must be sent prior to further transmission of data characters, whereby upon transmission thereafter of a data terminal motor-start signal by the data processor to the control device, said first circuit provides a motor-on status signal to the data processor and said second circuit provides a terminal busy condition signal to the data processor, the terminal busy condition signal further inhibiting transmission of data characters for said second predetermined interval until said second circuit thereafter provides a terminal non-busy condition signal.

7. A control device linking a data processor to a motor operated data terminal wherein the data processor provides information signals including data characters and data terminal motor-start signals, and wherein the data terminal motor is selectively operable between an on condition and an off condition, is programmed to switch from the on condition to the off condition after a first predetermined interval following the last reception of data characters from the data processor, switches to the on condition upon receipt of a data terminal motor-start signal, and reaches its normal operating speed in at least a second predetermined interval after the receipt of a data terminal motor-start signal, said control device comprising:

means for receiving information signals from the data processor and for transmitting the information signals to the data terminal;

a first circuit for sensing receipt of information signals from the data processor and for providing a motor status signal to the data processor, said first circuit including a first timer responsive to receipt of a motor start signal from the data processor for providing a motor-on status signal, and responsive to the absence of information signals from the data processor for a first predetermined interval for providing a motor-off status signal; and a second circuit, including a second timer, for sensing the motor status signal of said second circuit and for providing to the data processor a data terminal condition signal, said second timer normally providing a non-busy condition signal but responsive to a change in the motor status signal from a motor-off signal to a motor-on signal for providing a busy condition signal for a second predetermined interval, whereby upon interruption of transmission of data characters by said data processor for an interval of time equal to said first predetermined interval, said control device provides a motor-off signal to the data processor to indicate that a motor-start signal must be sent prior to further transmission of data characters, whereby upon transmission thereafter of a data terminal motor-start signal by the data processor to the control device, said first circuit provides a motor-on status signal to the data processor and said second circuit provides a terminal busy condition signal to the data processor, the terminal busy condition signal further inhibiting transmission of data characters for said second predetermined interval until said second circuit thereafter provides a terminal non-busy condition signal.

* * * * *